I. HOBSON.
Moth-Traps for Bee-Hives.
No. 151,128.                          Patented May 19, 1874.
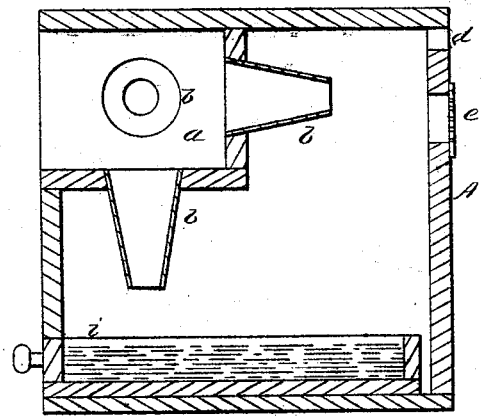

UNITED STATES PATENT OFFICE.

IRIS HOBSON, OF HEPLER, KANSAS.

IMPROVEMENT IN MOTH-TRAPS FOR BEE-HIVES.

Specification forming part of Letters Patent No. 151,128, dated May 19, 1874; application filed March 13, 1874.

*To all whom it may concern:*

Be it known that I, IRIS HOBSON, of Hepler, in the county of Crawford and State of Kansas, have invented certain new and useful Moth-Trap for Bee-Hives; and I do hereby declare the following to be a full, clear, and exact description of the invention, such as will enable others skilled in the art to which it pertains to make and use it, reference being had to the accompanying drawings, which form part of this specification, in which is shown a vertical section of my invention.

This invention has relation to moth-traps for bee-hives; and it consists in providing a box or chamber with conical tubes for the entrance of the moths and bees; a drawer for holding water, into which the moths fall, and an orifice through which the odor of the honey in the hive can penetrate to the trap and attract the moths, substantially as hereinafter more fully described.

Referring to the accompanying drawing, A is a box or chamber of any desired size, and fastened to the hive over the orifice where the bees enter. At the upper part of the front of the box A there is another and smaller box, *a*, open in front, and communicating with the inner chamber by means of bright metal tubes *b*, of a conical shape. At the back of the box are two holes, *d* and *e*. The former is the door through which the bees enter the hive, and the latter is to allow the odor of the honey to enter the trap. A drawer, *i*, is slid into the box through a recess made in the front of said box, and is kept full of water to drown the moths that fall into it.

The operation of the trap is as follows: The moths enter the box by the tubes *b*, being attracted by the brightness thereof, when they endeavor to enter the hive by the orifice *e*, to which they are drawn by the odor of the honey passing through the same, instead of toward the hive-entrance, with which the bees alone are familiar; but, failing in this, they fall into the water in the drawer *i*, and are drowned.

A piece of phosphorus may be placed on the trap, in order to make it more attractive to the moths.

Having fully described my invention, what I claim is—

In a moth-trap, the combination, with the trap-box A, having the orifices *d e*, of the decoy-tubes *b* and water-drawer *i*, substantially as shown and described, and for the purpose specified.

In testimony that I claim the foregoing I have hereunto set my hand this 2d day of March, 1874.

IRIS HOBSON.

Witnesses:
REES WILLIAMS,
JOHN LEWIS.